United States Patent [19]

Lapaglia

[11] Patent Number: 4,782,843
[45] Date of Patent: Nov. 8, 1988

[54] APPARATUS FOR CLEANING PARTICULATE MATERIAL

[76] Inventor: James Lapaglia, 1061 Ditmas Ave., Uniondale, N.Y. 11553

[21] Appl. No.: 49,945

[22] Filed: May 15, 1987

[51] Int. Cl.$^4$ .............................................. B08B 3/04
[52] U.S. Cl. ................................... 134/104; 134/133; 134/183; 134/200
[58] Field of Search ............... 134/104, 133, 182, 183, 134/198, 200; 210/190, 279; 366/177, 181, 341

[56] References Cited

U.S. PATENT DOCUMENTS

| | | | |
|---|---|---|---|
| 656,043 | 8/1900 | Paterson | 210/279 X |
| 914,475 | 3/1909 | Bedune | 134/198 X |
| 2,246,674 | 6/1941 | Gronemeyer | 134/104 |
| 2,549,169 | 4/1951 | Christy | 366/177 X |
| 2,742,381 | 4/1956 | Weiss et al. | 134/182 X |
| 3,381,823 | 5/1968 | Nash | 210/279 |
| 3,623,910 | 11/1971 | Calhoun et al. | 134/104 X |
| 3,647,188 | 3/1972 | Solt | 366/177 X |

*Primary Examiner*—Philip R. Coe
*Attorney, Agent, or Firm*—Steinberg & Raskin

[57] ABSTRACT

Apparatus for cleaning particulate material includes a hopper defining a downwardly tapering chamber and a nozzle for directing a high velocity liquid jet upwardly into the chamber. A tubular riser extends vertically through the chamber having a lower end situated proximate to, but spaced from, the liquid nozzle and an upper end situated at the upper end of the chamber. Particulate material to be cleaned is charged into the hopper so that a portion of the material falls into an agitation zone defined between the nozzle and the lower end of the riser. A liquid jet discharged from the nozzle is directed towards the lower end of the riser and agitates the dirty particulate material situated in the agitation zone and carries particulate material from the agitation zone upwardly through and out of the upper end of the riser. As the procedure continues, dirty particulate material continues to settle into the agitation zone to be partially washed by agitation and carried with the liquid jet through the riser. The level of liquid in the hopper chamber eventually reaches an overflow weir where it is discharged from the chamber. A return pipe can be attached to the upper end of the riser for returning the particulate material to a desired location.

16 Claims, 2 Drawing Sheets

APPARATUS FOR CLEANING PARTICULATE MATERIAL

BACKGROUND OF THE INVENTION

This invention relates to apparatus for cleaning or washing particulate material.

Many instances exist where it is necessary to periodically clean or wash particulate material. For example, swimming pool filter systems often incorporate filters which comprise particulate filter material through which the pool water is filtered. The particulate filter material must be periodically cleaned to maintain filtering efficiency. Another example is the case of gravel used in fish aquariums which should be cleaned or washed periodically.

The cleaning or washing of particulate material is a cumbersome and time consuming task as it is presently accomplished. In order to clean aquarium gravel, the gravel is removed from the previously drained aquarium and charged into a large washing tank where it is then sprayed for an extended period of time with a water wash which is then drained from the tank. This procedure is generally repeated several times until the gravel is sufficiently cleaned whereupon it is then returned to the tank. This procedure is time consuming and often is not as effective as would be desired. It is also difficult to return the gravel to the aquarium tank after washing has been completed.

SUMMARY OF THE INVENTION

Accordingly, it is an object of the present invention to provide new and improved apparatus for cleaning or washing particulate material.

Another object of the invention is to provide new and improved apparatus for cleaning or washing particulate material by which the material is cleaned to a greater degree and in less time than has been possible heretofore.

Still another object of the present invention is to provide new and improved apparatus for cleaning or washing particulate material, and by which the cleaned particulate material can be transferred to a desired location in a quick and easy manner.

Briefly, in accordance with the present invention, these and other objects are attained by providing apparatus including a hopper defining a chamber adapted to receive the particulate material to be cleaned and in which a tubular riser is situated having a lower end positioned proximate to the bottom wall of the hopper. A liquid nozzle is situated in opposed relationship to the lower end of the tubular riser for directing a liquid jet into the riser. The lower end of the riser is spaced from the nozzle so that when the hopper is charged with particulate material to be cleaned, a portion of the material becomes positioned in an agitation zone between the nozzle and the lower end of the riser. A liquid jet directed from the nozzle impacts against the particulate material in the agitation zone to separate dirt therefrom and then carries the particulate matter into and through the riser from whereupon it discharges from the upper end to settle onto the top of the particulate material where it can soak in the liquid filling the hopper.

Other preferred features the invention are discussed in greater detail below.

DESCRIPTION OF THE DRAWINGS

A more complete appreciation of the present invention and many of the attended advantages thereof will be readily understood by reference to the following detailed description when considered in connection with accompanying drawings in which.

DETAILED DESCRIPTION OF THE PREFERRED EMBODIMENTS

Figure 1:
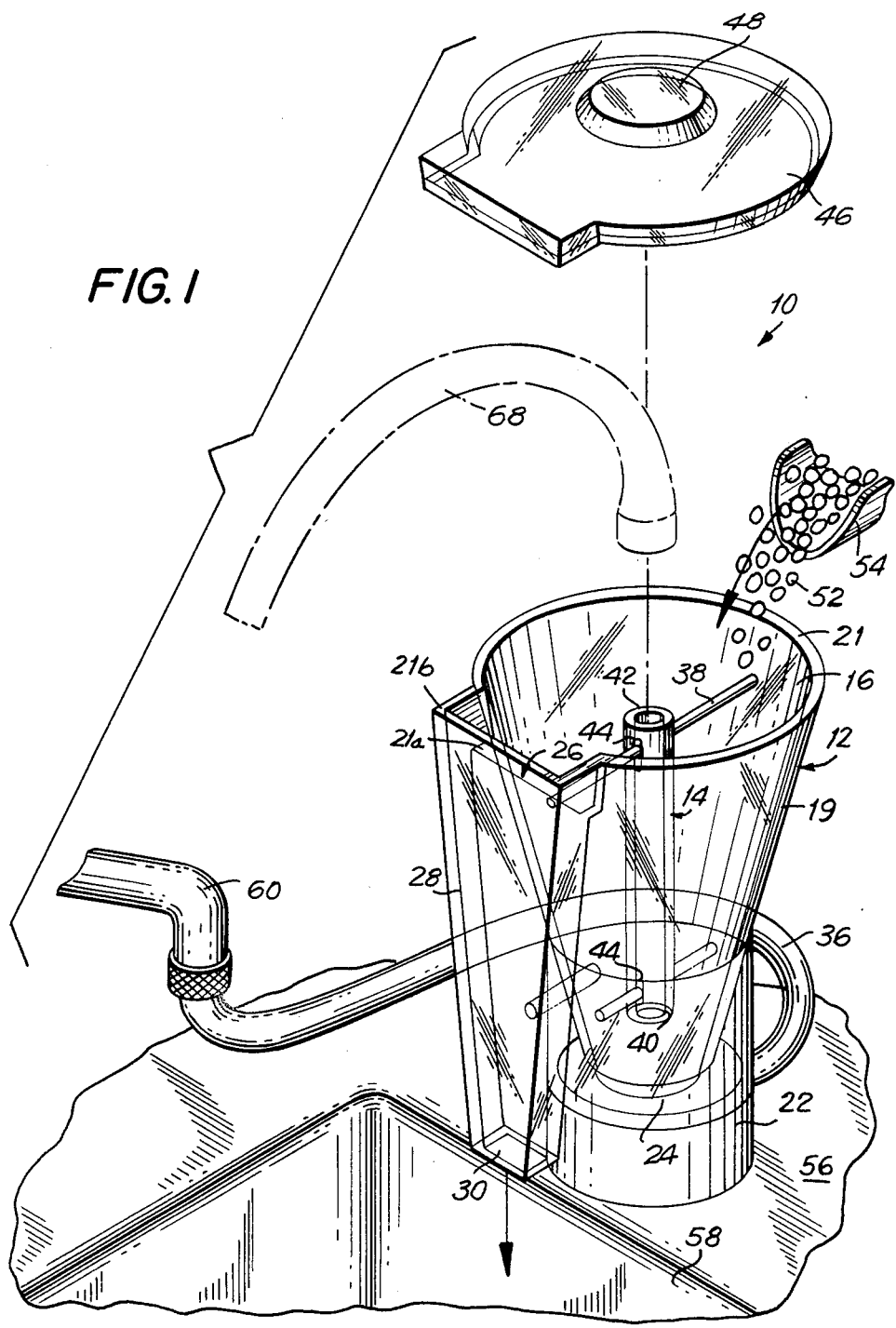
FIG. 1 is an exploded perspective view of apparatus for cleaning or washing particulate material in accordance with the invention.
Figure 2:
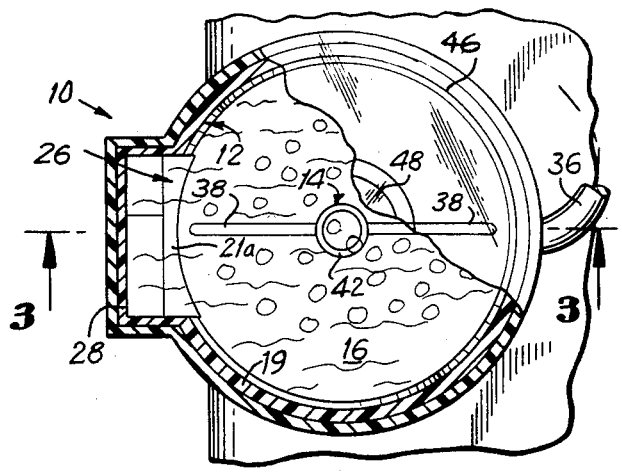
FIG. 2 is a top plan view in partial section of the apparatus shown in FIG. 1.

Referring now the drawings wherein like reference characters designate identical or corresponding parts throughout the several views, apparatus for cleaning or washing particulate material in accordance with the invention, designated 10, generally comprises a hopper 12, a tubular riser 14 extending vertically through a chamber 16 defined by the hopper 12, and a nozzle 18 for directing a liquid jet upwardly through the riser. The illustrated embodiment will be described in connection with the cleaning or washing of gravel from a fish aquarium although it is understood that apparatus in accordance with the invention may be used for cleaning or washing particulate material in any number of diverse applications.

The hopper 12 comprises a generally frusto-conical sidewall 19 defining a downwardly narrowing or tapering chamber 16 which is open at its upper end and closed at its bottom end by a bottom wall 20. Hopper sidewall 19 has an upper edge 21 which extends in a horizontal plane over the major part of the circumference. A segment of sidewall 19 has a reduced height terminating at an upper edge 21a defining an overflow weir 26 which communicates with the upper end of a downwardly narrowing overflow discharge pipe 28 which in the illustrated embodiment is formed integrally with hopper 12. The overflow discharge pipe 28 extends vertically adjacent to hopper 12 and has a lower discharge end 30 and an upper edge 21b in the same plane as the upper edge 21 of hopper sidewall 19. The hopper 12 is mounted on a base assembly including a base member 22 and a cup-shaped holder member 24. The hopper is situated within holder member 24 so that its bottom wall 20 rests on a resiliant cushion 25 and its side-wall 19 is engaged by the upper edge of holder member 24 over its circumference to provide stable mounting. The hopper 12, holder member 24 and discharge pipe 28 are preferably formed of transparent material, such as clear, rigid plastic material, so that the cleaning operation can be observed as it takes place as described below.

Nozzle 18 is provided in a central region of the bottom wall 20 of hopper 12 with its upper end substantially flush with the upper or inner surface of bottom wall 20. The nozzle 18 is adapted to communicate with a source of pressurized liquid through a rigid connection 32 which passes through base member 22 and which terminates at an external fitting 34 to which one end of a flexible hose 36 is connected for coupling the nozzle to a source of pressurized liquid.

Tubular riser 14 is mounted within the chamber 16 of hopper 12 by struts 38 and extends vertically substantially along the central axis of chamber 16. The lower end 40 of riser 14 is situated proximate to, but spaced from, the nozzle 18 to define a space therebetween. The upper end 42 of riser 14 is preferably situated substantially at the level of the upper edge 21a of the overflow weir 26 and event below the plane of the upper edge 21 of hopper sidewall 19. The riser 14 is preferably moveably mounted so as to be displaceable in the direction of its longitudinal axis so that the distance between the lower end 40 of riser 14 and nozzle 18 can be varied depending upon the size of the particulate material being washed. For example, a series of elongated grooves 44 (FIG. 1) can be formed in the outer surface of riser 14 in which the inner ends of struts 38 are received to permit the riser to be raised or lowered as desired.

Figure 3:
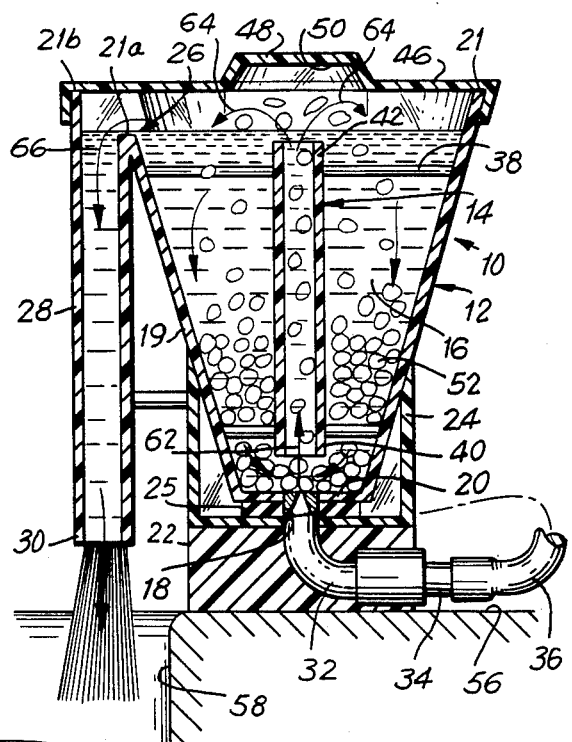
FIG. 3 is a section view taken along line 3—3 of FIG. 2.

A cover 46 is provided for closing the upper end of hopper 12 during the washing operation. Cover 46 is shaped to fit over the upper edges 21 and 21b of hopper sidewall 19 and discharge pipe 28. The upper edge 21a of overflow weir 26 is spaced from cover 46 as best seen in FIG. 3 to allow the washing liquid to pass from hopper chamber 16 into overflow discharge pipe 28 during operation. The cover 46 is formed with a raised central region 48 defining baffle surfaces 50 which are situated in opposed relationship to the upper end 42 of riser 14 when the cover is fitted onto the hopper. Cover 46 is also preferably formed of rigid transparent plastic material.

In operation, with cover 46 removed from the hopper 12, gravel 52 to be washed is charged into the empty chamber 16 of hopper 12 using a scoop 54 or similar device. In a typical application where dirty gravel from a fish aquarium is to be washed, fifteen pounds of gravel may be charged into the hopper chamber 16 to fill it to its substantial mid-height. The gravel may comprise loose rock fragments or pebbles having a maximum dimension from about ⅛ inch to about ¼ inch. Prior to charging the gravel into the hopper, the position of riser 14 is adjusted so that its lower end 40 is spaced an appropriate distance from nozzle 18 depending upon the size of the particulate material. In the instant example, the lower end 40 of riser 14 may be spaced from nozzle 18 a distance of about ¾ to 1 inch. The gravel falls to the bottom of chamber 16 so that some of the rock fragments or pebbles become situated in an agitation zone comprising the space between nozzle 18 and the lower end 40 of riser 14 and regions immediately proximate thereto. The cover 46 is then placed over hopper 12 to close its upper end whereupon the nozzle 18 is brought into communication with a source of pressurized liquid. In the instant example, the apparatus is preferably placed on a counter 56 at the edge of a sink or basin 58 so that the lower end 30 of overflow discharge pipe 28 is positioned over the basin. The free end of flexible pipe 36 is connected to a spigot 60 of sink 58 whereupon water under pressure is conducted to nozzle 18 through pipe 36, fitting 34 and connector 32. The water discharged from nozzle 18 is in the form of a jet directed towards the lower end 40 of riser 14. Before entering the riser 14, the water jet impinges against and agitates the gravel situated in the agitation zone to separate much of the dirt from the gravel surface.

At the same time, the water jet entrains and carries gravel from the agitation zone into the riser as shown by arrow 62 in FIG. 3 and as the gravel carried by the water jet exits from the upper end 42 of riser 14 the gravel is flung against the baffle surfaces 50 of the raised central region 48 of cover 46 as shown by arrow 64 in FIG. 3, thereby resulting in further separation of dirt from the gravel surface by virtue of the gravel impacting against the cover. The gravel then falls onto the top of the gravel supply in chamber 16. As the gravel in the agitation zone is carried into riser 14, the gravel supply in hopper chamber 16 settles so that new uncleaned gravel becomes situated in the agitation zone.

As the procedure continues the level of the water in chamber 16 continues to rise until it reaches the level of the upper edge 21a of overflow weir 26 whereupon the water overflows into discharge pipe 28 as shown by arrow 66 and discharges from the lower end 30 into basin 58. The overflowing water carries the dirt and other debris separated from the gravel by the agitation and impact actions described above as well as the dirt separated from the gravel as the gravel soaks within the water. The water discharging through pipe 28 gradually becomes cleaner, i.e., less dirt is carried with the overflowing water as the procedure continues as the gravel within the hopper becomes cleaner, thereby giving a good visual indication of the extent to which the gravel has been cleaned. The washing procedure can be terminated when the overflowing water is substantially clear. It has been found through experimentation that the entire washing procedure for fifteen pounds of gravel requires about 8 to 10 minutes. Of course, the longer the washing procedure is continued, the cleaner the gravel will become.

Figure 4:
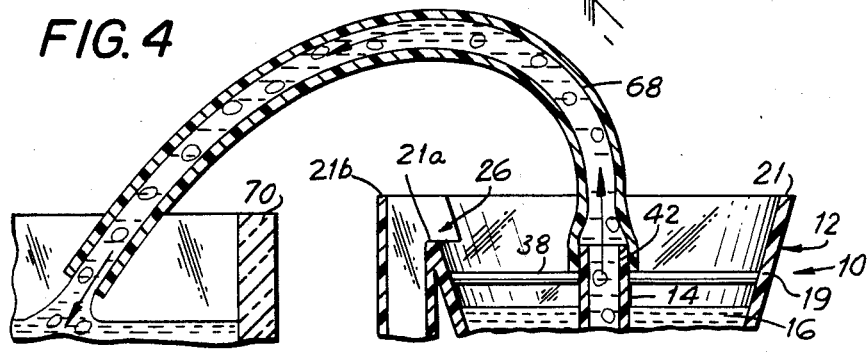
FIG. 4 is a detail view in section of the apparatus shown in FIG. 1 during operation with a return pipe connected thereto.

After the washing has been completed, the hopper containing the cleaned gravel can be carried to the aquarium whereupon the cleaned gravel is dumped back into the aquarium. However, the invention advantageously provides an alternative technique for transferring the cleaned gravel back to the aquarium. In particular, referring to FIGS. 1 and 4, when the washing operation has been completed, the water supply is temporarily shut off and cover 46 removed. One end of a return pipe 68 is coupled over the upper end 42 of riser 14 while the other end of return pipe 68 is positioned over the aquarium 70. The water supply is then turned on. A water jet entrains the clean gravel in the agitation zone and carries it through the riser 14 as before. However, the water and gravel carried in it pass into the return pipe 68 from which it is discharged into the aquarium 70. As the gravel transfer procedure continues, new clean gravel continuously settles into the agitation zone to replace the clean gravel carried away by the water jet until all of the clean gravel has been transferred through return pipe 68 into the aquarium.

The apparatus of the invention enables particulate material to be cleaned or washed to a high degree in a relatively short time. It can accommodate particulate material of varying size ranges through the adjustability of the riser although this feature is not absolutely essential. Moreover, suitable treatment agents may be added to the hopper prior and/or during the washing procedure. For example, a disinfecting agent may be added to the hopper which would then mix with the water as the washing procedure continues to disinfect the surface of the particulate material. Activating agents may be added where filtering material is being cleaned to activate the material during the washing procedure. The shape of the hopper may be different from that shown. For example, the hopper may have a truncated pyramidal configuration formed by planar sidewalls although a conical configuration is preferred since the particulate material would generally not adhere to curved sidewalls to the same extent that it would adhere to planar sidewalls.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. Apparatus for cleaning particulate material, comprising:
   a hopper including at least one sidewall and a bottom wall defining a downwardly tapering chamber adapted to receive particulate material to be cleaned, each of said at least one sidewall having an upper edge;
   an overflow weir formed in said at least one hopper sidewall at a level below the level of a lowermost one of said upper edge of said at least one hopper sidewall;
   a cover for closing an upper end of said hopper chamber, said cover having an inner surface facing into said hopper chamber;
   liquid nozzle means situated in the region of said bottom wall of said hopper and adapted to be coupled to a source of liquid under pressure for directing a liquid jet into said hopper chamber; and
   a tubular riser situated within said chamber having a lower end situated proximate to and spaced from said liquid nozzle means and an upper end spaced from said inner surface of said cover, said liquid nozzle means positioned to direct said liquid jet into said lower end of said riser and through said riser to discharge from said upper end of said riser.

2. The combination of claim 1 further including discharge pipe means situated outside of said hopper chamber communicating with said overflow weir.

3. The combination of claim 1 wherein said cover includes at least one baffle surface whereby the particulate material-carrying liquid impinges against said baffle surface to further separate dirt from said particulate material.

4. The combination of claim 1 wherein said nozzle means are situated substantially flush with an inner surface of said bottom wall of said hopper.

5. The combination of claim 1 wherein said tubular riser is positioned substantially centrally within said hopper chamber and extends substantially vertically therewithin.

6. The combination of claim 1 further including means for adjustably mounting said tubular riser in said hopper chamber whereby said distance by which said lower end of said riser is spaced from said nozzle means is adjustable to accommodate various size ranges of said particulate material.

7. The combination of claim 1 wherein said hopper has a substantially frusto-conical shape.

8. The combination of claim 1 further including a pipe having one end adapted to be coupled to said upper end of said tubular riser for receiving cleaned particulate material from said upper end of said riser and carrying the material away from said apparatus.

9. Apparatus for cleaning particulate material, comprising:
   a hopper including at least one sidewall and a bottom wall defining a chamber adapted to receive particulate material to be cleaned;
   a tubular riser situated within said chamber having a lower end situated proximate to said hopper bottom wall and an upper end;
   liquid nozzle means situated proximate to said lower end of said riser adapted to be coupled to a source of liquid under pressure for directing a liquid jet into said riser, said nozzle means being spaced at least a slight distance from said lower end of said riser to define an agitation zone therebetween; and
   means for discharging liquid from said hopper chamber, said liquid discharging means comprising an overflow weir provided at an upper end region of said hopper, and discharge pipe means communicating with said overflow weir, whereby when the liquid reaches a certain level in said upper chamber, the liquid overflows over said weir into said discharge pipe means,
   whereby a portion of particulate material charged into said hopper chamber becomes situated in said agitation zone and upon operation, a liquid jet directed from said nozzle means impinges against the particulate material in said agitation zone to separate dirt therefrom and carries said particulate material into and through said riser.

10. Apparatus for cleaning particulate material, comprising:
    a hopper including at least one sidewall and a bottom wall defining a chamber adapted to receive particulate material to be cleaned;
    a tubular riser situated within said chamber having a lower end situated proximate to said hopper bottom wall and an upper end;
    liquid nozzle mean situated proximate to said lower end of said riser adapted to be coupled to a source of liquid under pressure for directing a liquid jet into said riser, said nozzle means being spaced at least a slight distance from said lower end of said riser to define an agitation zone therebetween; and
    a cover for closing an upper end of said hopper chamber, said cover having an inner surface spaced from said upper end of said riser and including at least one baffle surface whereby by particulate material-carrying liquid impinges against said baffle surface to further spearate dirt from said particulate material,
    whereby a portion of particulate material charged into said hopper chamber becomes situated in said agitation zone and upon operation, a liquid jet directed from said nozzle means impinges against the particulate material in said agitation zone to separate dirt therefrom and carries said particulate material into and through said riser.

11. Apparatus for cleaning particulate material, comprising:
    a hopper including at least one sidewall and a bottom wall defining a chamber adapted to receive particulate material to be cleaned;
    a tubular riser situated within said chamber having a lower end situated proximate to said hopper bottom wall and an upper end;
    liquid nozzle means situated proximate to said lower end of said riser adapted to be coupled to a source of liquid under pressure for directing a liquid jet into said riser, said nozzle means being spaced at least a slight distance from said lower end of said riser to define an agitation zone therebetween; and means for adjustably mounting said tubular riser in said hopper chamber, whereby said distance by which said lower end of said riser is spaced from said nozzle means is adjustable, whereby a portion of particulate material charged into said hopper chamber becomes situated in said agitation zone and upon operation, a liquid jet directed from said nozzle means impinges against the particulate material in said agitation zone to separate dirt therefrom and carries said particulate material into said through said riser.

12. The combination of claim 11 wherein said nozzle means are situated substantially flush with an inner surface of said bottom wall of said hopper.

13. The combination of claim 11 wherein said tubular riser is positioned substantially centrally within said hopper chamber and extends substantially vertically therein.

14. The combination of claim 11 wherein said hopper chamber tapers in a downward direction.

15. The combination of claim 11 where said hopper has a substantially frusto-conical shape.

16. Apparatus for cleaning particulate material, comprising:

a hopper including at least one sidewall and a bottom wall defining a chamber adapted to receive particulate material to be cleaned;

a tubular riser situated within said chamber having a lower end situated proximate to said hopper bottom wall and an upper end;

liquid nozzle means situated proximate to said lower end of said riser adapted to be coupled to a source of liquid under pressure for directing a liquid jet into said riser, said nozzle means being spaced at least a slight distance from said lower end of said riser to define an agitation zone therebetween; and a pipe having one end adapted to be coupled to said upper end of said tubular riser, whereby a portion of particulate material charged into said hopper chamber becomes situated in said agitation zone and upon operation, a liquid jet directed from said nozzle means impinges against the particulate material in said agitation zone to separate dirt therefrom and carries said particulate material into said through said riser whereupon after the particular material in the hopper chamber has been cleaned, one end of said pipe is coupled to said upper end of said tubular riser for receiving clean particulate material from the upper end of said riser and carrying the material away from said apparatus.

* * * * *